(12) United States Patent
Breuer et al.

(10) Patent No.: US 12,118,094 B2
(45) Date of Patent: Oct. 15, 2024

(54) METHODS AND APPARATUS FOR STARTUP PROCESSES FOR A POWER MACHINE

(71) Applicant: Doosan Bobcat North America, Inc., West Fargo, ND (US)

(72) Inventors: Jim Breuer, Mandan, ND (US); Monte Spadgenske, Bismarck, ND (US); Mike Fitzgerald, Moorhead, MN (US); Jason Magnuson, West Fargo, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 298 days.

(21) Appl. No.: 17/621,596

(22) PCT Filed: Jun. 29, 2020

(86) PCT No.: PCT/US2020/040109
§ 371 (c)(1),
(2) Date: Dec. 21, 2021

(87) PCT Pub. No.: WO2020/264491
PCT Pub. Date: Dec. 30, 2020

(65) Prior Publication Data
US 2022/0350892 A1   Nov. 3, 2022

Related U.S. Application Data

(60) Provisional application No. 62/867,420, filed on Jun. 27, 2019.

(51) Int. Cl.
*G06F 21/00* (2013.01)
*G06F 21/31* (2013.01)
(Continued)

(52) U.S. Cl.
CPC .......... *G06F 21/575* (2013.01); *G06F 21/31* (2013.01); *G06F 21/83* (2013.01); *G06F 2221/2149* (2013.01)

(58) Field of Classification Search
CPC ........ G06F 21/31; G06F 21/575; G06F 21/83; G06F 2221/2149
See application file for complete search history.

(56) References Cited

U.S. PATENT DOCUMENTS 6,343,237 B1 * 1/2002 Rossow ............. G05B 23/0267
700/83
10,384,648 B1 * 8/2019 Chapin ................ G05D 1/0061
(Continued)

OTHER PUBLICATIONS

Stolarz, Reducing OS Boot Times for In-Car Computer Applications, Linux Journal (https://www.linuxjournal.com), Apr. 22, 2004, 5 pages.
(Continued)

*Primary Examiner* — Joseph P Hirl
*Assistant Examiner* — Chi D Nguy
(74) *Attorney, Agent, or Firm* — Quarles & Brady LLP (57) ABSTRACT

A power machine (200) can be configured to operate in one or more startup modes during startup processes (300), including during startup processes (310) for displays (286) or other input devices. Access to power machine functionality, including access only to limited power machine functionality, can be enabled during the startup processes (300) according to permissions (332) of the startup mode.

20 Claims, 6 Drawing Sheets (51) Int. Cl.
*G06F 21/57* (2013.01)
*G06F 21/83* (2013.01)

(56) References Cited

U.S. PATENT DOCUMENTS

| | | | |
|---|---|---|---|
| 2013/0311762 A1 | 11/2013 | Bank et al. | |
| 2015/0205946 A1* | 7/2015 | Aurongzeb | G06F 3/0346 |
| | | | 726/19 |
| 2017/0206092 A1* | 7/2017 | Raman | G06F 9/4411 |
| 2017/0289121 A1* | 10/2017 | Harwell | E02F 9/24 |
| 2019/0320573 A1* | 10/2019 | Miyazaki | A01B 63/00 |
| 2021/0090363 A1* | 3/2021 | Ramos | G06Q 50/08 |

OTHER PUBLICATIONS

PCT International Search Report and Written Opinion, PCT/US2020/040109, Sep. 28, 2020, 17 pages.

* cited by examiner

METHODS AND APPARATUS FOR STARTUP PROCESSES FOR A POWER MACHINE

BACKGROUND

This disclosure is directed toward power machines. More particularly, this disclosure is directed toward enabling or disabling power machine functionality during startup procedures for power machines. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Some power machines have operating systems (e.g., keyless security systems) that require an operator to enter a passcode to unlock certain power machine functionality, such as operation of the power source of the power machine or operation of auxiliary hydraulic systems. Due to the complexity of software utilized or other factors, operators may experience delays (e.g., of 20 seconds or more) between the initial activation of a display (or operating system generally) and availability of the display (or operating system, generally) for entry of a code to enable relevant functionality. Although the requirement of a code to unlock power machine functionality can provide numerous benefits, including by helping to allow only authorized operation of a given power machine, the delay in system startup can also delay the start of work for operators and can therefore be disfavored.

The discussion above is merely provided for general background information and is not intended to be used as an aid in determining the scope of the claimed subject matter.

SUMMARY

Embodiments of the disclosed subject matter can use a startup mode to provide access to certain power machine functionality during a startup process for a power machine. In some embodiments, this can allow operators to execute certain operations during the startup process, including before a display is available for entry of a passcode for full operation. In some embodiments, permissions for a startup mode may allow operators to access only limited power machine functionality during a startup process.

Some embodiments provide a method of operating a power machine with an input device (e.g., a display). An input-device startup process can be initiated for the input device. The power machine can be automatically placed in a startup mode during the input-device startup process. Limited access to power machine functionality can be provided according to permissions of the startup mode. After the input-device startup process is completed, proof of authorization (e.g., a passcode) can be requested to allow access to additional power machine functionality.

In some embodiments, permissions of a startup mode can include operation of a power source of a power machine.

In some embodiments, permissions of a startup mode can not permit select hydraulic operations.

In some embodiments, additional power machine functionality that can be allowed after an initialization process can include full power machine functionality.

In some embodiments, an initialization process can include a startup process for an input device (e.g., a display), during which the display (286) is not configured to receive user input for control of the power machine (200).

Some embodiments provide an operating system for a power machine. A processor can be configured to enable operation of the power machine in a startup mode during a startup process. The startup mode can be selectively configurable to automatically provide access, during the startup process, to any of: no power machine functionality, limited power machine functionality, and full power machine functionality.

In some embodiments, when a startup process is configured to provide access to no power machine functionality or limited power machine functionality, entry of proof of authorization (e.g., a passcode) may be required to access full power machine functionality at the completion of the startup process.

In some embodiments, operation of a power machine can be enabled in a default startup mode upon one or more of: incorrect entry of a passcode, a predetermined consecutive number of times, or expiration of a predetermined amount of time after a passcode request is made.

In some embodiments, a default startup mode can provide reduced access to power machine functionality as compared to a startup mode.

In some embodiments, an input device can be operatively connected to a power machine. A startup process can include an input-device startup process, during which the input device (286) is not enabled for user input.

In some embodiments, an input device can be a display device.

In some embodiments, a startup process can be configured to permit operation of a power source of a power machine, but not to permit select hydraulic operations.

Some embodiments provide a power machine. The power machine can include a power source and an operator station. One or more work elements can be configured to be operated based on power from the power source. An input device can be configured to receive input for control of the power machine by an operator in the operator station. A control system can include a processor device configured to implement a startup process. The startup process can include initiating an initialization process for the input device and can include automatically placing the power machine in a startup mode during the initialization process. In the startup mode, the processor device can be configured to limit access to power machine functionality according to permissions of the startup mode.

In some embodiments, permissions of a startup mode can permit operation of a power source of a power machine but can not permit select other power machine functionality.

In some embodiments, permissions of a startup mode can not permit select hydraulic operations of the power machine.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DETAILED DESCRIPTION

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

With conventional designs, power machines may be equipped to provide a range of computer-controlled power machine functionality (e.g., access to engine power—that is, the ability to start the engine, traction operations, hydraulic operations, climate control, and so on). Such power machines can have various computerized devices that control these functions and provide one or more interfaces to an operator for receiving operator inputs. On some machines, these computerized devices have security features that are designed to prevent unauthorized operation of the machines, such as requiring an operator to enter a passcode before the machine can be started or otherwise operated. For the purposes of clarity in this discussion, the phrases "initialization process" or "computer initialization process" refer to steps taken by a computerized device when it is first powered up to prepare it for normal operation. In addition, the phrase "enablement process" refers to the activity taken by an operator to unlock security features on the power machine such as by entering a passcode or similar types of activities.

Some or all of these devices that provide input devices for an operator to unlock a security system may not be enabled to provide any power machine functionality during their own startup or initialization processes. For example, some power machines may require operators to enter passcodes (or "unlock" codes) into a relevant input device of an operating system to enable any power machine functionality. This requirement may help to prevent unauthorized access to power machine functionality, but it may also delay the start of work-site operations while computerized devices are performing their initialization processes. For example, while a display that is configured to receive a passcode is running its initialization process, it may not be possible for an operator to enter a passcode because the display is simply not ready to receive inputs from the operator. Accordingly, although the operator may be ready to work, active operation of the power machine including starting the engine, may not be possible at least until after the display has completed its initialization routine. This may lead to impatience or frustration on the part of power machine operators, as well as delaying productive activities. Accordingly, it may be useful to provide access to certain (e.g., limited) power machine functionality during computer initialization processes, including before entry of a passcode that may be required for full and sustained execution of power machine operations.

Some embodiments disclosed herein can address these and other needs. For example, some embodiments can utilize a temporary security bypass mode for a power machine during an initialization process for a display or other input device. During the temporary security bypass mode, a limited range of power machine functionality can be enabled, so that an operator may be temporarily allowed to command the execution of certain operations with the power machine while one or more computerized devices are performing initialization processes. Once the initialization processes have been completed, the operator may then be prompted to enter a passcode into the display or other input device, in a timely manner to enable additional power machine functionality and prevent the power machine from stopping functions. Entering the passcode will end the temporary security bypass mode and allow for normal operation of the power machine.

In different embodiments, different ranges of power machine functionality can be provided during a temporary security bypass mode, depending on permissions specified by the power machine for the initialization bypass mode. For example, some temporary security bypass modes may allow the operator to command the machine to start its engine, but may not allow the operator to command function of the power machine's hydraulic system, or the initialization bypass mode may allow access to some hydraulic operations or actuators but not to others. As another example, certain initialization bypass modes may allow access to all but a select set of advanced functionality, such as a set of features that may be selectable or adjustable through a display that is not operational during the relevant startup process. In some embodiments, the permissions of a particular temporary security bypass mode may be customizable, such as through a passcode-protected settings menu.

As used herein, "power machine functionality" refers generally to movement- and power-based operations of a power machine, such as operation of a power source (e.g., engine), access to power from a power source, use of tractive elements, actuation of hydraulic equipment, movement of lift arms or other devices, and so on. Accordingly, for example, "power machine functionality" should be distinguished from "operating system functionality," which relates to operation of display screens or other input/output devices, computer-based security systems (e.g., passcode or operator-presence systems), central processing units or other controllers, and so on. Of note, however, certain power machine functionality may necessarily include computer-based functionality, such as for electronic operation of controllers, sensors, switches, actuators, and signaling devices. Accordingly, restrictions on power machine functionality during initialization processes may sometimes necessarily include restrictions on operation of some computerized systems. Further, although examples below relate generally to limitations on power machine functionality during initialization processes, some embodiments may include similarly implemented limitations on operating system functionality.

Figure 2:
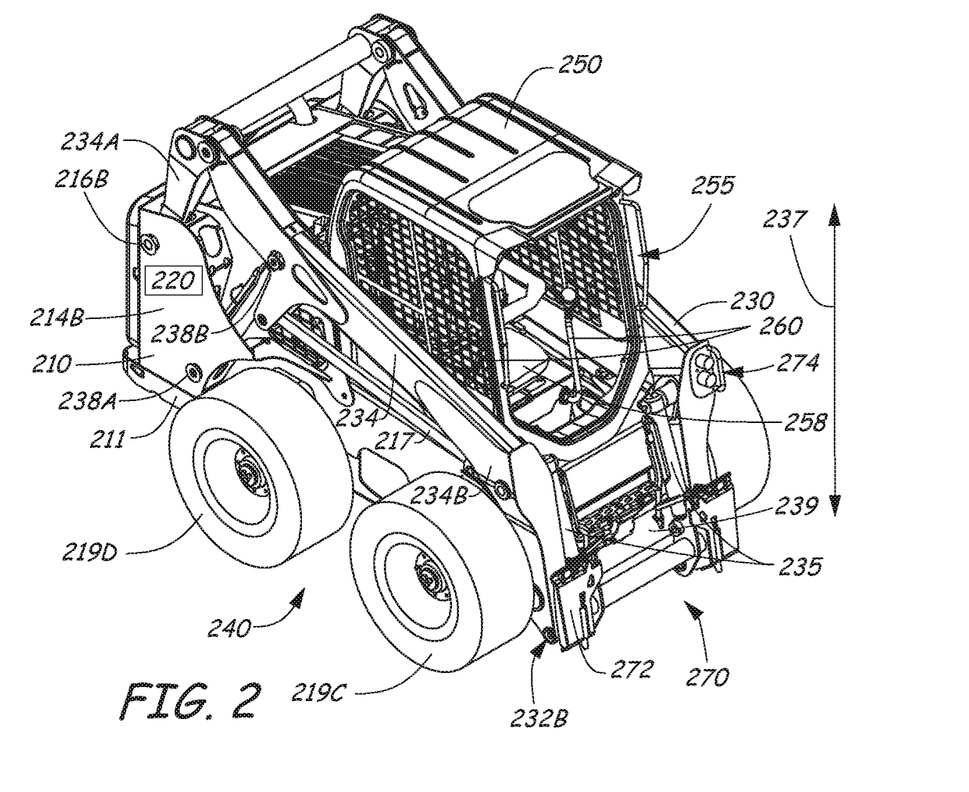
FIGS. 2-3 illustrate perspective views of a representative power machine in the form of a skid-steer loader of the type on which the disclosed embodiments can be practiced.
Figure 3:
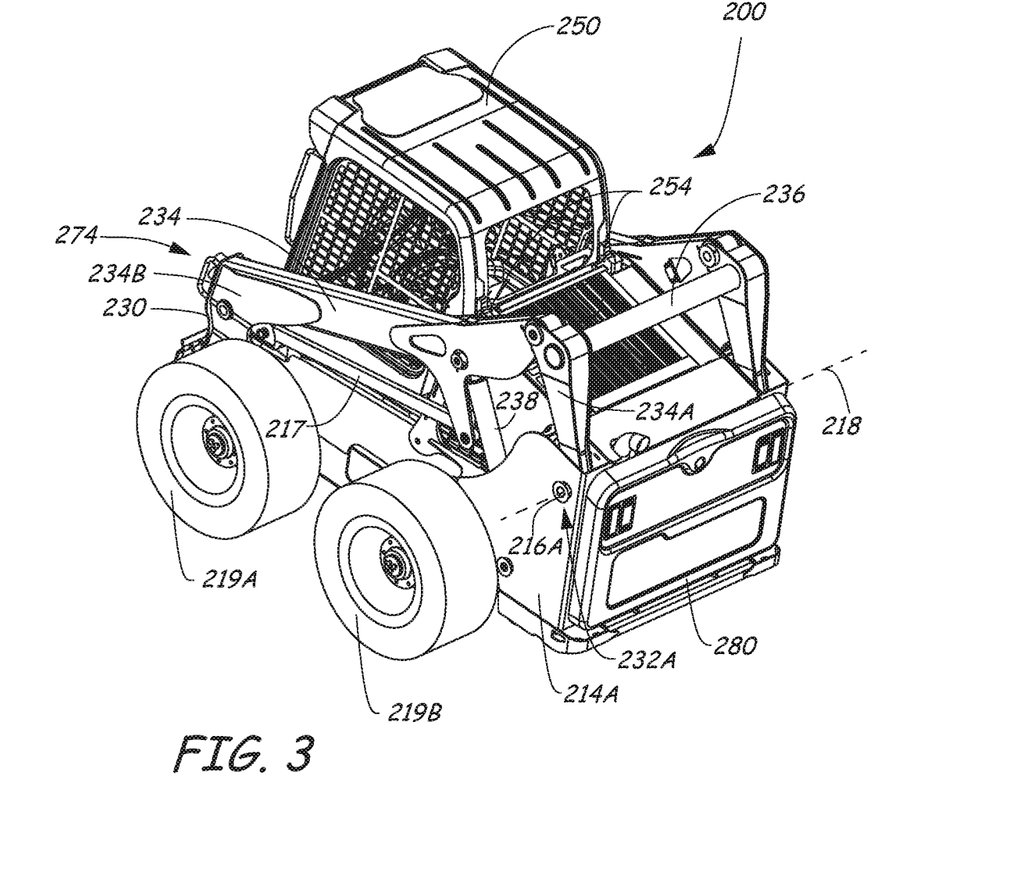

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Figure 1:
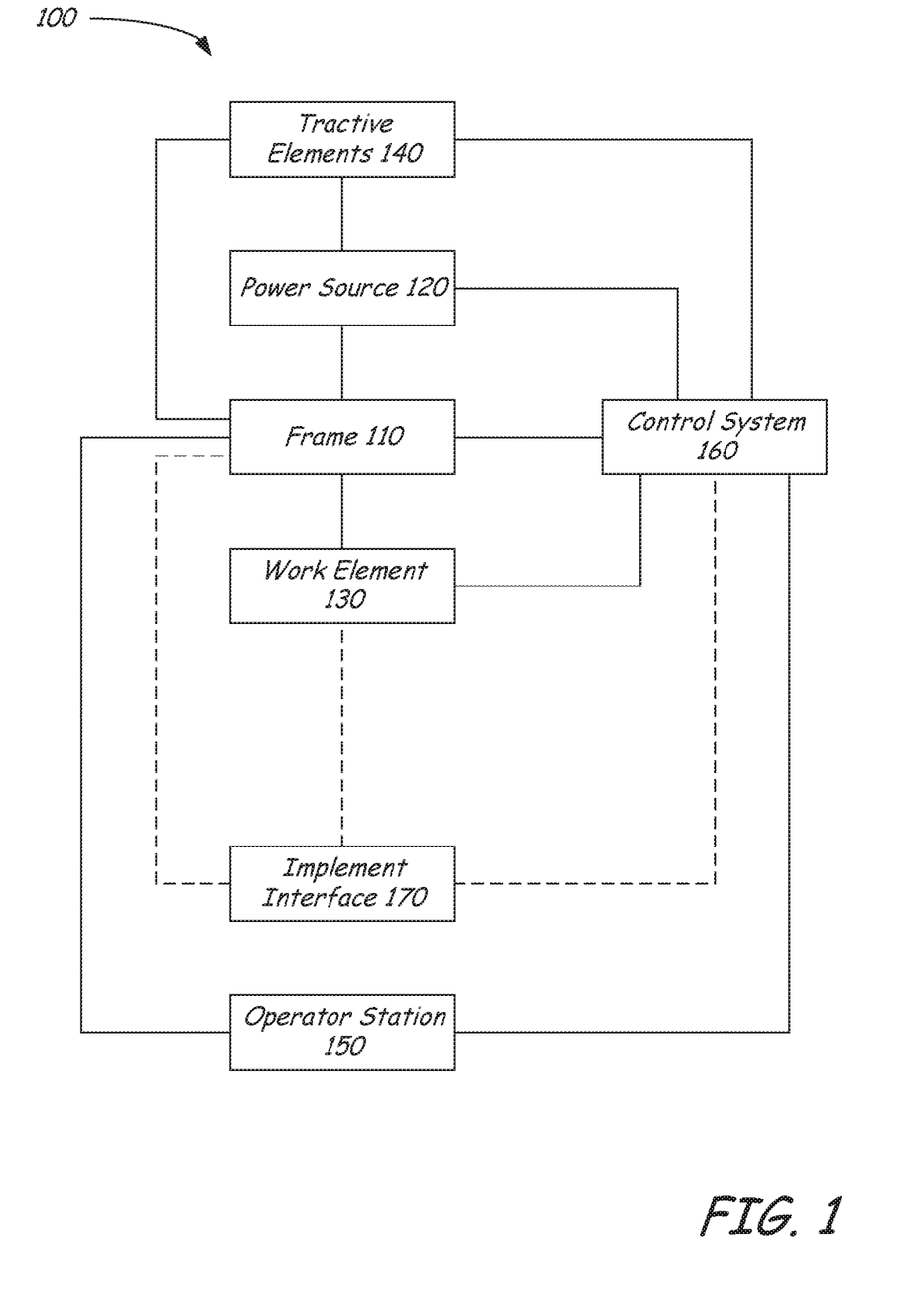
FIG. 1 is a block diagram illustrating functional systems of a representative power machine on which embodiments of the present disclosure can be advantageously practiced.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator-controlled functions on the power machine, FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles, Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements. Correspondingly, although some example power machines discussed herein are presented as skid-steer power machines, some embodiments disclosed herein can be implemented on a variety of other power machines. For example, some embodiments can be implemented on compact loaders or compact excavators that do not accomplish turns via skidding.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form on a side of the frame 210 for illustrative purposes but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
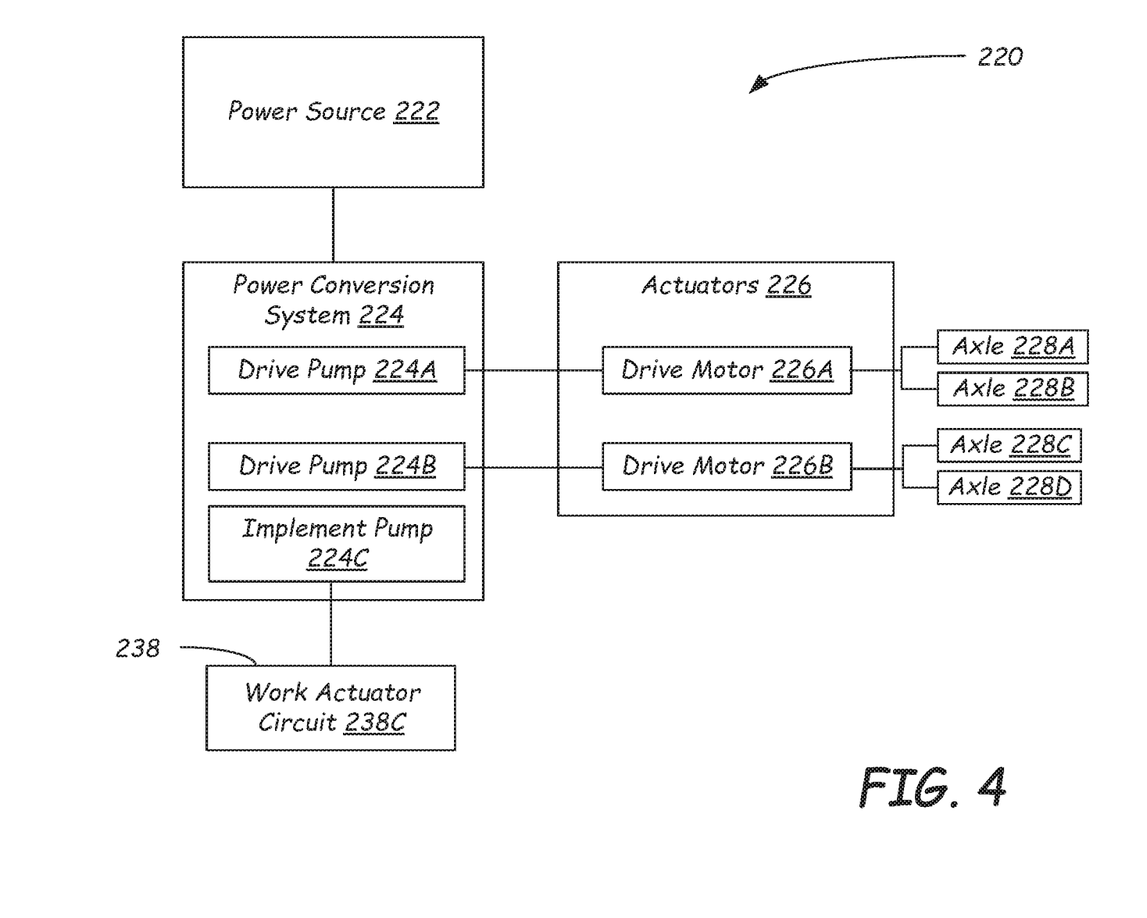
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine, Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit 238C also includes control logic to selectively provide a pressurized hydraulic fluid to an attached implement. The control logic of power machine 200 includes an open center, 3 spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
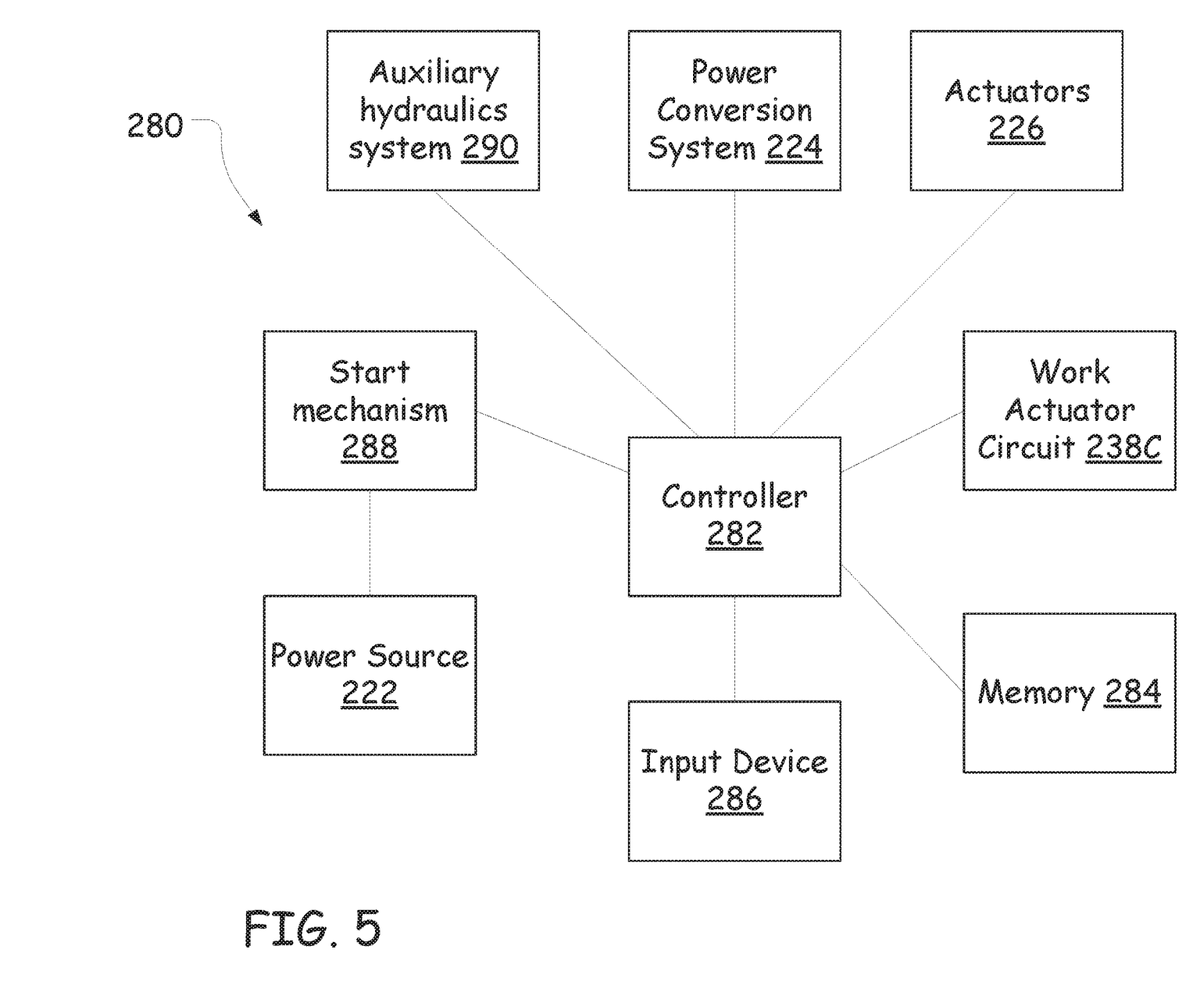
FIG. 5 is a block diagram illustrating aspects of an operating system for use with power machines, of a type on which the disclosed embodiments can be practiced.

FIG. 5 illustrates aspects of a control system 280 that can be used to control certain operations of a power machine, such as the power machine 200 of FIGS. 2 and 3. The control system 280 includes a controller 282, which can, for example, be configured as a general or special purpose electronic processing device in communication with a memory 284. One or more input devices, represented generally by input device 286, are in communication with the controller 282. Operators can manipulate the input device 286 so that it provides user input signals to the controller 282. In some embodiments, one of the input device represented by input device 286 can be configured as a combination input/output device, such as a touchscreen display device, that can receive input from a user and can provide information to the user based on signals received from the controller 282 or other devices (not shown).

In different embodiments, a controller of a control system for a power machine can be configured to communicate with a wide range of other devices, to provide instructions, receive signals, or otherwise control operations of the power machine. In the illustrated embodiment, for example, the controller 282 is in communication with a start mechanism 288, the power conversion system 224 (see also FIG. 4), the actuators 226 (see also FIG. 4), an auxiliary hydraulics system 290, and the work actuator circuit 238C (see also FIG. 4). Thus arranged, the controller 282 can control the start mechanism 288 to start up the power source 222 (see also FIG. 4, an example of a power source is an internal combustion engine), and selectively operate control devices of the power conversion system 224, the actuators 226, the auxiliary hydraulics system 290, and/or the work actuator circuit 238C to control other power machine functionality. Generally, a variety of other configurations are also possible, including configurations in which a controller is in communication with additional or different functional sub-systems of a power machine. Further, although the controller 282 is illustrated schematically as a single component, other configurations can include multiple controllers that are distributed about a power machine or elsewhere.

As also discussed above, through appropriate configuration of the control system 280 or other similar control systems, a power machine can be configured so that particular (e.g. full, limited, or zero) power machine functionality may be available during initialization processes. Further, as appropriate, additional power machine functionality can be made available only after the initialization processes have completed and, for example, after a correct passcode has been provided. For example, the controller 282 can be configured to implement a startup mode that operates as a temporary security bypass mode during an initialization process for the input device 286, under which only select power machine functionality is enabled at one or more of the power source 222 (e.g., via control of the start mechanism 288), the auxiliary hydraulic system 290 (via work actuator circuit 238C), the power conversion system 224, the actuators 226, other functions of the work actuator circuit 238C besides the auxiliary hydraulic system 290, or other sub-systems of the power machine 200. Correspondingly, certain other power machine functionality may not be enabled by the controller 282 (i.e., may be locked out) while the power machine 200 is in the temporary security bypass mode, which may continue until after completion of the initialization process and entry of a correct passcode at the input device 286.

Figure 6:
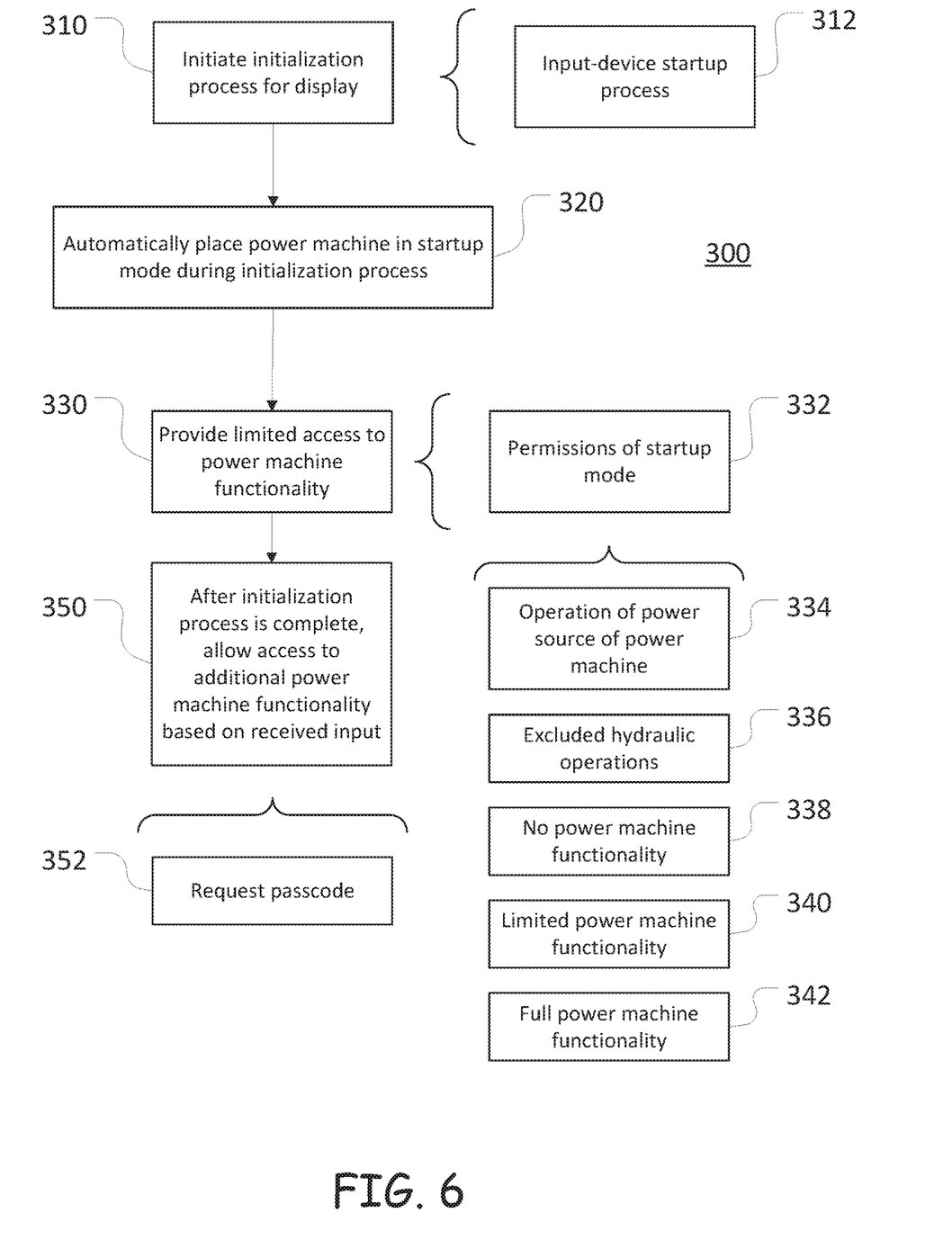
FIG. 6 is a block diagram illustrating aspects of a method for use with power machines, of a type on which the disclosed embodiments can be practiced.

In some embodiments, the principles disclosed herein can be implemented as a method, including a computer-implemented method that can be at least partly executed by a processor device, based on appropriate input from an operator or from a variety of sensors or other modules. For example, a method 300 for operating a power machine as shown in FIG. 6, can include initiating 310 an initialization process for an input device, such as a touchscreen or other display. The initiating 310 of the initialization process can occur based on a variety of parameters, including an initial input from an operator, and may generally correspond to the startup of a power machine for operation, although implementation at other times is also possible. In some cases, the initialization process can correspond to a startup process 312 for the input device, during which time the input device may not be available for use input to control aspects of the power machine (e.g., operation of hydraulic systems).

The method 300 can further include automatically placing 320 a power machine in startup mode during the initiated 310 initiation process. In some cases, the startup mode may correspond to limitations to functionality for the power machine, including for systems that may be available for operation (e.g., finished with respective initialization sub-processes) even before the initialization process for the input device is completed. For example, the method 300 can include providing 330 limited access to functionality of the power machine during the startup mode or at other times). In some cases, the limited access to functionality may correspond to a duration of the startup process 312 for an input device, or to other time limits or conditions.

In some cases, limited access that is provided 330 to power machine functionality can be determined according to prescribed permissions 332 of a startup mode. For example, access to certain power machine functionality may be limited until an input device has advanced sufficiently through a startup process 312 to be ready to receive an enabling input (e.g., a passcode or other authorization input) from a user. In some cases, permissions 332 of a startup mode can include permissions for operation 334 of a power source of the power machine. Thus, for example, an operator may be able to start an engine of a power machine during the initialization process for an input device, even though other functionality (e.g., certain hydraulic operations) may not be immediately available.

In some cases, permissions 332 of a startup mode can permit no power machine functionality 338, including operation of a power source. In some cases, permissions 332 of a startup mode can permit limited power machine functionality 340. For example, in some cases, the permissions 332 of a startup mode can prevent access to excluded hydraulic operations 336, while permitting (or not permitting) other operations. As another example, the permissions 332 of a startup mode can set limits within which some machine functionality of the power machine, including those described above, can be operated. For example, speed or range limits for travel or movement of work elements may be imposed according to some permissions 332. Thus, as also noted above, an operator may be prevented from operating certain hydraulic (or other) devices of a power machine, or may be restricted to operating those devices only in certain ways, until an input device has been sufficiently initialized to receive an authorization input (e.g., a passcode) to verify that the operator is authorized to use those devices. In some cases, the permissions 332 of the startup mode can permit full functionality 342 of the power machine. In some cases, the permissions 332 can be customized for particular power machines, operators, locations, or other parameters.

After the initialization process is completed, the method 300 can include allowing access 350 to additional power machine functionality based on input received by the input device. The received input can be requested from an operator, for example, by requesting 352 a passcode or another input (e.g., a voice command for voice recognition, a face-, retina-, or fingerprint-scan, etc.). For example, the method 300 can include limiting operation of a power machine based on the permissions 332 of a startup mode until an initialization process for an input device has been completed and an operator has demonstrated appropriate authorization to proceed. In some embodiments, if appropriate authorization is not demonstrated (e.g., a correct passcode is not timely provided), the method 300 may include maintaining restricted operation according to the permissions 332 of the startup mode or allowing (or not allowing) operation according to a default mode (e.g., operation of a power source only, no operation of certain hydraulic functions, no operation of any power machine functionality, etc.).

In some embodiments, aspects of this disclosure, including computerized implementations of methods according to this disclosure, can be implemented as a system, method, apparatus, or article of manufacture using standard programming or engineering techniques to produce software, firmware, hardware, or any combination thereof to control a processor device or a computer (e.g., a processor device operatively coupled to a memory) to implement aspects detailed herein. Accordingly, for example, some embodiments can be implemented as a set of instructions, tangibly embodied on a non-transitory computer-readable media, such that a processor device can implement the instructions based upon reading the instructions from the computer-readable media. Some embodiments can include (or utilize) a device such as an automation device, a special purpose or general-purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

Certain operations of methods according to some embodiments, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Although the present invention has been described by referring preferred embodiments, workers skilled in the art will recognize that changes may be made in form and detail without departing from the scope of the discussion.

What is claimed is:

1. A method of operating a power machine with a display, the method comprising:
   initiating an initialization process for the display;
   automatically placing the power machine in a startup mode during the initialization process;
   prior to completion of the initialization process, providing limited access to power machine functionality according to permissions of the startup mode, the limited access including one or more of: operation of a power source of the power machine, access to power from the power source, actuation of hydraulic equipment, or control of one or more of a tractive element or a lift arm assembly;
   after the initialization process is completed, requesting a passcode to allow access to additional power machine functionality; and
   providing access to the additional power machine functionality based on correct entry of the passcode.

2. The method of claim 1, wherein the permissions of the startup mode include operation of the power source of the power machine.

3. The method of claim 2, wherein the limited access does not permit select hydraulic operations.

4. The method of claim 1, wherein the additional power machine functionality includes full power machine functionality.

5. The method of claim 1, wherein the initialization process includes a startup process for the display, during which the display is not configured to receive user input for control of the power machine.

6. An operating system for a power machine, the operating system comprising:
   a processor device that is configured to enable operation of the power machine in a startup mode during a startup process, the startup process including starting a power source of the power machine and initiating an initialization process for an input device, the input device being configured to receive an authorization input after implementation of the startup mode;
   wherein the startup mode is selectively configurable to automatically provide access, during the startup process, to any of: no power machine functionality, and limited power machine functionality; and
   wherein the limited power machine functionality includes operation of one or more of: the power source, or tractive elements of the power machine.

7. The operating system of claim 6, wherein, when the startup process is configured to provide access to no power machine functionality or limited power machine functionality, the processor device requires entry of the authorization input to access full power machine functionality at completion of the startup process.

8. The operating system of claim 7, wherein the processor device is configured to enable operation of the power machine in a default startup mode upon one or more of: incorrect entry of the authorization input a predetermined consecutive number of times, or an expiration of a predetermined amount of time after the request for the authorization input is made.

9. The operating system of claim 8, wherein the default startup mode provides reduced access to power machine functionality as compared to the startup mode.

10. The operating system of claim 7,
    wherein the startup process includes an input-device startup process, during which the input device is not enabled for user input.

11. The operating system of claim 10, wherein the input device is a display device.

12. The operating system of claim 7, wherein the startup process is configured to permit operation of the power source of the power machine, but not to permit select hydraulic operations.

13. The operating system claim 6, wherein the authorization input includes one or more of: a passcode, a voice command, a face scan, a retina scan, or a fingerprint scan.

14. A power machine comprising:
a power source;
an operator station;
one or more work elements configured to be operated using power from the power source;
an input device configured to receive input for control of the power machine by an operator in the operator station; and
a control system that includes a processor device configured to implement a startup process;
wherein the startup process includes:
initiating an initialization process for the input device; and
automatically placing the power machine in a startup mode during the initialization process;
wherein, in the startup mode, the processor device is configured to provide limited access to power machine functionality according to permissions of the startup mode; and
wherein the permissions include, before receiving an authorization input via the input device, one or more of: operation of the power source; access to power from the power source; actuation of hydraulic equipment; or control of one or more of tractive elements of the power machine or a lift arm assembly of the power machine.

15. The power machine of claim 14, wherein the permissions of the startup mode permit operation of the power source of the power machine but do not permit select other power machine functionality.

16. The power machine of claim 15, wherein the permissions of the startup mode do not permit select hydraulic operations of the power machine.

17. The power machine of claim 15, wherein the permissions of the startup mode do not permit any hydraulic operations of the power machine.

18. The power machine of claim 15, wherein the permissions of the startup mode permit access to power from the power source to provide power to at least one of the one or more work elements.

19. The power machine of claim 14, wherein the permissions of the startup mode limit movement of at least one of the one or more work elements.

20. The power machine of claim 14, wherein the startup process ends after the initialization process is completed or the operator demonstrates appropriate authorization.

* * * * *